US011915164B2

(12) United States Patent
Takiguchi et al.

(10) Patent No.: US 11,915,164 B2
(45) Date of Patent: Feb. 27, 2024

(54) SYSTEM AND METHOD FOR MANAGING VEHICLES USED FOR A CAR-SHARING SERVICE

(71) Applicant: TOYOTA JIDOSHA KABUSHIKI KAISHA, Toyota (JP)

(72) Inventors: Yuka Takiguchi, Toyota (JP); Tetsushi Okamoto, Toyota (JP); Hirokazu Kobayashi, Toyota (JP); Minoru Nakadori, Toyota (JP); Daiki Kaneichi, Tokyo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/573,678

(22) Filed: Jan. 12, 2022

(65) Prior Publication Data

US 2022/0261700 A1    Aug. 18, 2022

(30) Foreign Application Priority Data

Feb. 17, 2021    (JP) .................................. 2021-023743

(51) Int. Cl.
*G06Q 10/02* (2012.01)
*G06Q 10/0631* (2023.01)
*G06K 7/14* (2006.01)
*G06Q 50/30* (2012.01)

(52) U.S. Cl.
CPC ........... *G06Q 10/02* (2013.01); *G06K 7/1417* (2013.01); *G06Q 10/06315* (2013.01); *G06Q 50/30* (2013.01)

(58) Field of Classification Search
CPC .............................. G06Q 10/02; G06Q 50/30
See application file for complete search history.

(56) References Cited

U.S. PATENT DOCUMENTS

| 2010/0280700 A1* | 11/2010 | Morgal .................. G06Q 10/02 705/5 |
| 2013/0317693 A1* | 11/2013 | Jefferies .................. B60R 25/24 701/31.5 |
| 2013/0325521 A1* | 12/2013 | Jameel .................. G06Q 10/02 705/5 |

(Continued)

FOREIGN PATENT DOCUMENTS

| CN | 103489309 B | 9/2015 |
| JP | 2017-102553 A | 6/2017 |

OTHER PUBLICATIONS

Wen, Jian, et al., "Transit-oriented autonomous vehicle operation with integrated demand-supply interaction", 2018, Transportation Research Part C: Emerging Technologies, vol. 97, pp. 216-234 (Year: 2018).*

*Primary Examiner* — Jeff Zimmerman
*Assistant Examiner* — Wayne S. Murray
(74) *Attorney, Agent, or Firm* — Oliff PLC

(57) ABSTRACT

An information processing apparatus manages a vehicle used for a car-sharing service. The information processing apparatus includes a control unit configured to acquire, from a user, as application information for using the vehicle, one of application information for reservation use for making a reservation in advance and application information for on-demand use for accepting use of a vehicle stopped at an on-demand stand-by station. The same vehicle can be used for both the reservation use and the on-demand use.

17 Claims, 16 Drawing Sheets

(56) References Cited

U.S. PATENT DOCUMENTS

| | | | | |
|---|---|---|---|---|
| 2017/0132934 A1* | 5/2017 | Kentley | .................. | G08G 1/202 |
| 2017/0316535 A1* | 11/2017 | Hirose | ................... | G06Q 10/02 |
| 2018/0267541 A1* | 9/2018 | Goldberg | ............... | G06Q 50/30 |
| 2020/0111268 A1* | 4/2020 | Montague | .............. | G06Q 50/30 |

* cited by examiner

FIG. 15

| TYPE OF VEHICLE | RESERVATION TABLE | STATUS | VEHICLE NO. | DAY N / DAY N+1 Schedule |
|---|---|---|---|---|
| A | TA1 | IN USE | A1 | UNRESERVED / RESERVED (12:00) → DT (20:00) → RESERVED (0:00-4:00) → DT (8:00) → RESERVED (12:00-16:00) |
| A | TA2 | UNRESERVED | — | UNRESERVED → RESERVED → DT → UNRESERVED |
| B | TB1 | IN USE | B1 | RESERVED → DT → RESERVED → UNRESERVED |
| B | TB2 | UNRESERVED | — | UNRESERVED → RESERVED |

CURRENT TIME

FIG. 16

| TYPE OF VEHICLE | RESERVATION TABLE | STATUS | VEHICLE NO. | DAY N 0:00 — 12:00 — 16:00 — 20:00 — DAY N+1 0:00 — 4:00 — 8:00 — 12:00 — 16:00 |
|---|---|---|---|---|
| A | TA1 | UNRESERVED | — | UNRES-ERVED / RESERVED / DT / RESERVED / DT / RESERVED / DT / RESERVED / DT / RESERVED / DT |
| | TA2 | UNRESERVED | — | UNRESERVED |
| | TA3 | UNRESERVED | — | UNRESERVED |
| | TA4 | UNRESERVED | — | UNRESERVED |

CURRENT TIME

SYSTEM AND METHOD FOR MANAGING VEHICLES USED FOR A CAR-SHARING SERVICE

CROSS-REFERENCE TO RELATED APPLICATION

This application claims priority to Japanese Patent Application No. 2021-023743 filed on Feb. 17, 2021, incorporated herein by reference in its entirety.

BACKGROUND

1. Technical Field

The present disclosure relates to an information processing apparatus, a non-transitory storage medium, and an information processing method.

2. Description of Related Art

With the spread of a car-sharing service, various technologies for managing vehicles used in the car-sharing service are being examined.

For example, Japanese Unexamined Patent Application Publication No. 2017-102553 discloses a vehicle management system in which vehicles can be reasonably shared by merging vehicle management in car-sharing with vehicle management in car rental.

SUMMARY

For a user who uses a car-sharing service, it is convenient to be able to use the car-sharing service according to use forms of both reservation use for making a reservation in advance and using a sharing car and on-demand use for applying for on-the-spot use of a sharing car stopped at a stand-by station and using the sharing car.

The present disclosure provides a technology for smoothly executing both reservation use and on-demand use in a car-sharing service.

An information processing apparatus according to a first aspect of the present disclosure manages a vehicle used for a car-sharing service. The information processing apparatus includes a control unit configured to acquire, from a user, as application information for using the vehicle, one of application information for reservation use for making a reservation in advance and application information for on-demand use for accepting use of the vehicle stopped at an on-demand stand-by station. The same vehicle is allowed to be used for both the reservation use and the on-demand use.

In the first aspect, the application information for the reservation use may include information on a desired kind of vehicle, a date and time of starting the use, a scheduled date and time of return, and a desired boarding place.

In the first aspect, the application information for the on-demand use may include information on the scheduled date and time of return.

In the first aspect, in the case of the on-demand use, the control unit may acquire the application information for the on-demand use from a user terminal that reads a two-dimensional code attached to the vehicle stopped at the on-demand stand-by station.

In the first aspect, the on-demand use may have a minimum provision guarantee time period.

In the first aspect, the reservation use may have an upper limit on a usable time.

In the first aspect, the on-demand use may have an upper limit on a usable time.

A non-transitory storage medium according to a second aspect of the present disclosure stores a program causing a computer that manages a vehicle used for a car-sharing service to execute operations. The operations include acquiring, from a user, as application information for using the vehicle, one of application information for reservation use for making a reservation in advance and application information for on-demand use for accepting use of the vehicle stopped at an on-demand stand-by station. The same vehicle is allowed to be used for both the reservation use and the on-demand use.

In the second aspect, the application information for the reservation use may include information on a desired kind of vehicle, a date and time of starting the use, a scheduled date and time of return, and a desired boarding place.

In the second aspect, the application information for the on-demand use may include information on a scheduled date and time of return.

In the second aspect, the operations may further include acquiring the application information for the on-demand use from a user terminal that reads a two-dimensional code attached to the vehicle stopped at the on-demand stand-by station.

In the second aspect, the on-demand use may have a minimum provision guarantee time period.

In the second aspect, the reservation use may have an upper limit on a usable time.

In the second aspect, the on-demand use may have an upper limit on a usable time.

An information processing method according to a third aspect of the present disclosure is executed by an information processing apparatus that manages a vehicle used for a car-sharing service. The information processing method includes a step of acquiring, from a user, as application information for using the vehicle, one of application information for reservation use for making a reservation in advance and application information for on-demand use for accepting use of the vehicle stopped at an on-demand stand-by station. The same vehicle is allowed to be used for both the reservation use and the on-demand use.

In the third aspect, the application information for the reservation use may include information on a desired kind of vehicle, a date and time of starting the use, a scheduled date and time of return, and a desired boarding place.

In the third aspect, the application information for the on-demand use may include information on a scheduled date and time of return.

In the third aspect, the information processing method may further include a step of acquiring the application information for the on-demand use from a user terminal that reads a two-dimensional code attached to the vehicle stopped at the on-demand stand-by station.

In the third aspect, the on-demand use may have a minimum provision guarantee time period.

In the third aspect, the reservation use may have an upper limit on a usable time.

With the each aspect of the present disclosure, it is possible to smoothly execute both reservation use and on-demand use in a car-sharing service.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 15 is a diagram illustrating an example of the reservation table of a plurality of types of vehicles; and FIG. 16 is a diagram illustrating an example of the reservation table when four users make reservations.

DETAILED DESCRIPTION OF EMBODIMENTS

Hereinafter, embodiments of the present disclosure will be described with reference to the drawings.

Figure 1:
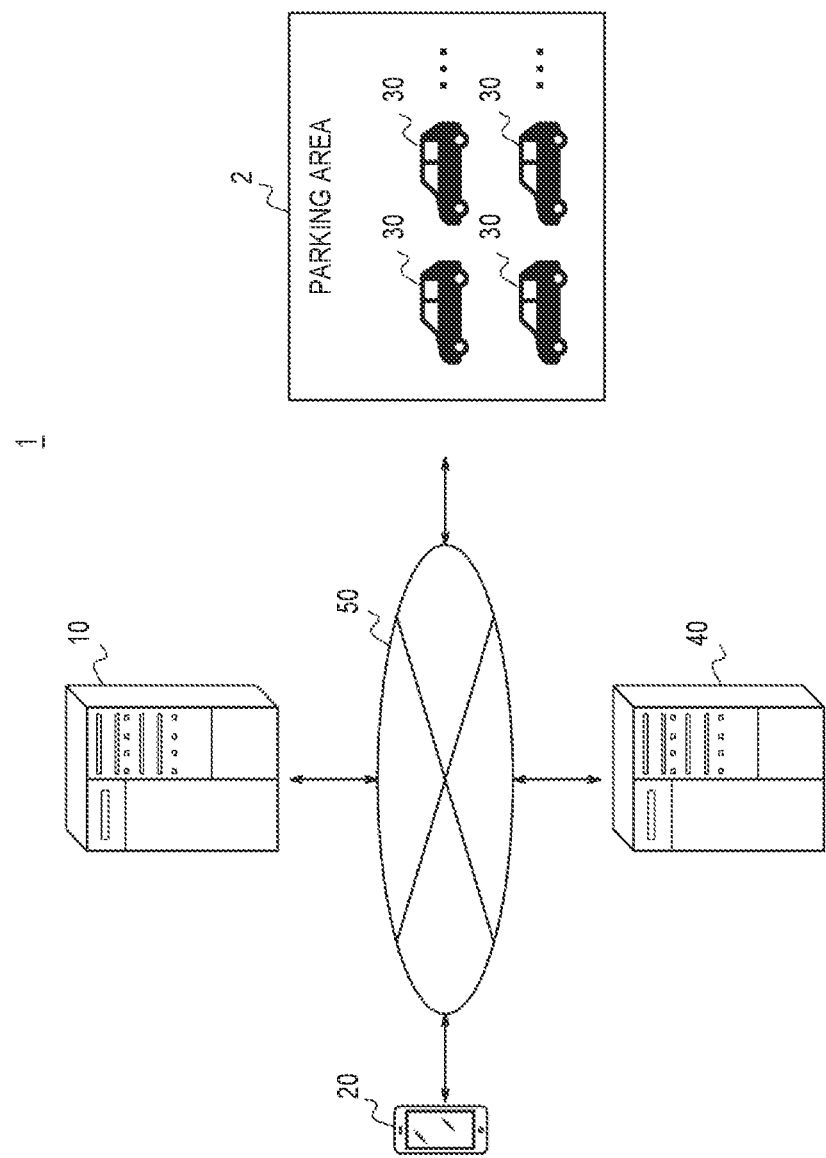
FIG. 1 is a diagram illustrating a configuration of an information processing system according to an embodiment of the present disclosure.

FIG. 1 is a diagram illustrating a configuration of an information processing system 1 according to an embodiment of the present disclosure. The configuration and an overview of the information processing system 1 according to the embodiment of the present disclosure will be described with reference to FIG. 1.

The information processing system 1 includes an information processing apparatus 10, a terminal 20, a vehicle 30, and a server 40. The information processing apparatus 10, the terminal 20, the vehicle 30, and the server 40 are communicably connected to each other via a network 50. The network 50 includes a mobile communication network, the Internet, and the like.

FIG. 1 illustrates one information processing apparatus 10, one terminal 20, and one server 40. However, the number of the information processing apparatus 10, the terminal 20, and the server 40 may be two or more, respectively.

The vehicle 30 is used for a car-sharing service. The vehicle 30 stands by in a parking area 2 when not used by a user. The number of vehicles 30 for the car-sharing service managed by the information processing apparatus 10 may be any number.

The information processing apparatus 10 may be, for example, a dedicated computer configured to function as a server. The information processing apparatus 10 may be a general-purpose personal computer (PC).

The information processing apparatus 10 can communicate with the terminal 20, the vehicle 30, and the server 40 via the network 50. The information processing apparatus 10 manages the vehicle 30 used for the car-sharing service.

The terminal 20 is owned by a user who uses the car-sharing service. Examples of the terminal 20 include a smartphone or a tablet.

The terminal 20 can communicate with the information processing apparatus 10, the vehicle 30, and the server 40 via the network 50.

The vehicle 30 may be, for example, any type of automobile, such as a gasoline vehicle, a diesel vehicle, a hybrid vehicle (HV), a plug-in hybrid vehicle (PHV), an electric vehicle (EV), or a fuel cell vehicle (FCV). The vehicle 30 is capable of autonomous driving. The vehicle 30 has an automatic valet parking (AVP) function. In other words, when the user uses the car-sharing service, the vehicle 30 can autonomously move to a place at which the user boards the vehicle 30. Further, when the user finishes using the car-sharing service and exits the vehicle 30, the vehicle 30 can autonomously move to a stand-by station for an unused vehicle 30.

The vehicle 30 can communicate with the information processing apparatus 10, the terminal 20, and the server 40 via the network 50.

The server 40 may be a dedicated computer configured to function as a server. The server 40 may be a general-purpose PC.

The server 40 can communicate with the information processing apparatus 10, the terminal 20, and the vehicle 30 via the network 50. The server 40 monitors a status of the vehicle 30 in the parking area 2 and transmits it to the information processing apparatus 10. The server 40 may monitor the status of the vehicle 30 in the parking area 2 based on data acquired from, for example, a camera and a sensor installed in the parking area 2.

Figure 2:
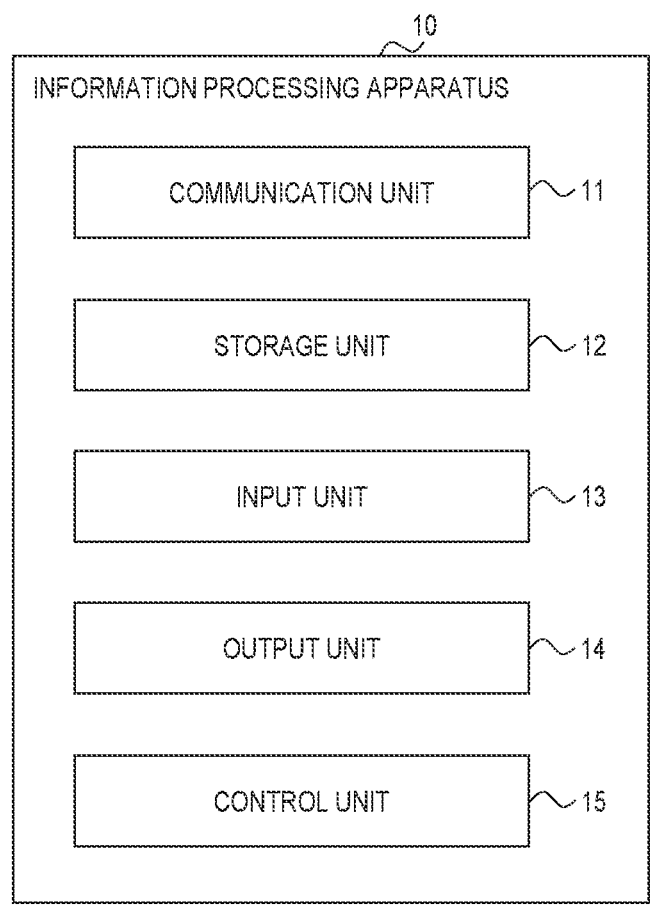
FIG. 2 is a block diagram illustrating a configuration of an information processing apparatus according to an embodiment of the present disclosure.

The configuration of the information processing apparatus 10 according to the embodiment of the present disclosure will be described with reference to FIG. 2.

The information processing apparatus 10 includes a communication unit 11, a storage unit 12, an input unit 13, an output unit 14, and a control unit 15.

The communication unit 11 includes a communication module connected to the network 50. For example, the communication unit 11 may include a communication module corresponding to a local area network (LAN). In an embodiment, the information processing apparatus 10 is connected to the network 50 via the communication unit 11. The communication unit 11 transmits and receives various pieces of information via the network 50. The communication unit 11 can communicate with the terminal 20, the vehicle 30, and the server 40 via the network 50.

For example, the storage unit 12 may be, but is not limited to, a semiconductor memory, a magnetic memory, or an optical memory. The storage unit 12 may function as, for example, a primary storage device, a secondary storage device, or a cache memory. The storage unit 12 stores any information used for an operation of the information processing apparatus 10. For example, the storage unit 12 may store a system program, an application program, and various pieces of information received by the communication unit 11. The information stored in the storage unit 12 may be updatable with information received from the network 50 via, for example, the communication unit 11. A part of the storage unit 12 may be installed outside the information processing apparatus 10. In that case, the part of the storage unit 12 installed outside the information processing apparatus 10 may be connected to the information processing apparatus 10 via any interface.

The input unit 13 includes one or more input interfaces that detect a user input and acquire input information based on a user's operation. For example, the input unit 13 includes, but is not limited to, a physical key, a capacitance key, a touch screen provided integrally with a display of the output unit 14, or a microphone that receives a voice input.

The output unit 14 includes one or more output interfaces that notify information to the user by outputting it. For example, the output unit 14 includes, but is not limited to, a display that outputs information as an image or a speaker that outputs information as voice.

The control unit 15 includes at least one processor, at least one dedicated circuit, or a combination thereof. The processor may be a general-purpose processor, such as a central processing unit (CPU) or a graphics processing unit (GPU), or a dedicated processor specialized for a specific process. Examples of the dedicated circuit include a field-programmable gate array (FPGA) or an application specific integrated circuit (ASIC). The control unit 15 executes processing associated with the operation of the information processing apparatus 10 while controlling each unit of the information processing apparatus 10.

Figure 3:
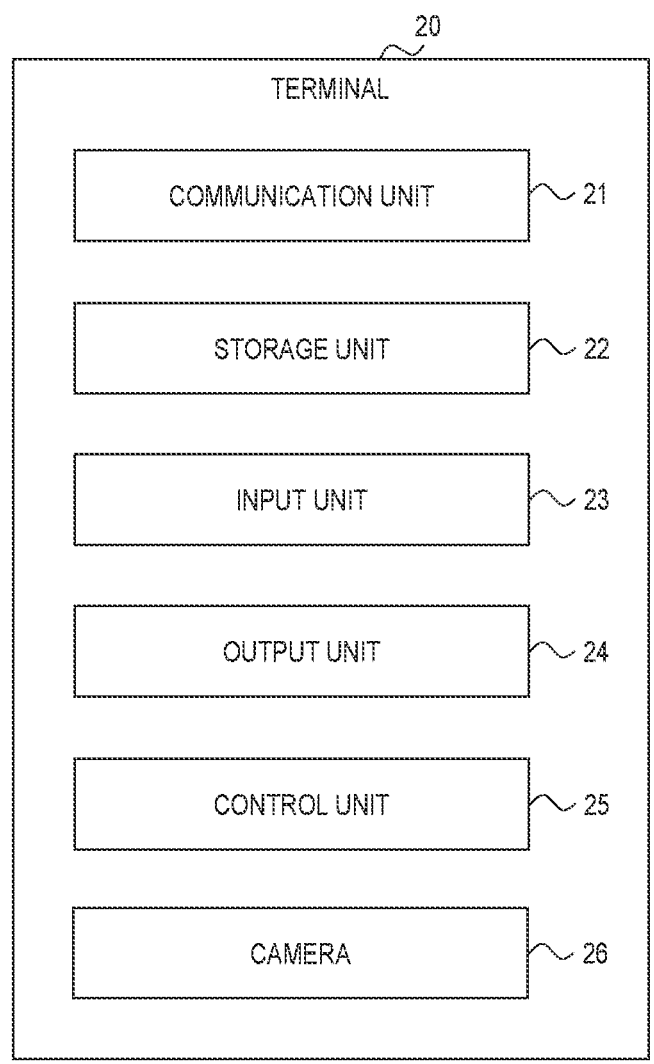
FIG. 3 is a block diagram illustrating a configuration of a terminal according to an embodiment of the present disclosure.

A configuration of the terminal 20 according to an embodiment of the present disclosure will be described with reference to FIG. 3.

The terminal 20 includes a communication unit 21, a storage unit 22, an input unit 23, an output unit 24, a control unit 25, and a camera 26.

The communication unit 21 includes a communication module connected to the network 50. For example, the communication unit 21 may include a communication module corresponding to a mobile communication standard, such as Long-Term Evolution (LTE), Fourth Generation (4G), and Fifth Generation (5G). In an embodiment, the terminal 20 is connected to the network 50 via the communication unit 21. The communication unit 21 transmits and receives various pieces of information via the network 50. The communication unit 21 can communicate with the information processing apparatus 10, the vehicle 30, and the server 40 via the network 50.

For example, the storage unit 22 may be, but is not limited to, a semiconductor memory, a magnetic memory, or an optical memory. The storage unit 22 may function as, for example, a primary storage device, a secondary storage device, or a cache memory. The storage unit 22 stores any information used for an operation of the terminal 20. For example, the storage unit 22 may store a system program, an application program, and various pieces of information received by the communication unit 21. The information stored in the storage unit 22 may be updatable with information received from the network 50 via, for example, the communication unit 21. A part of the storage unit 22 may be installed outside the terminal 20. In that case, the part of the storage unit 22 installed outside the terminal 20 may be connected to the terminal 20 via any interface.

The input unit 23 includes one or more input interfaces that detect a user input and acquire input information based on the user's operation. For example, the input unit 23 may be, but is not limited to, a physical key, a capacitance key, a touch screen provided integrally with a display of the output unit 24, or a microphone that receives a voice input.

The output unit 24 includes one or more output interfaces that notify information to the user by outputting it. For example, the output unit 24 includes, but is not limited to, a display that outputs information as an image or a speaker that outputs information as voice.

The control unit 25 includes at least one processor, at least one dedicated circuit, or a combination thereof. The processor may be a general-purpose processor, such as a CPU or a GPU, or a dedicated processor specialized for a specific process. The dedicated circuit may be, for example, an FPGA or an ASIC. The control unit 25 executes processing associated with the operation of the terminal 20 while controlling each unit of the terminal 20.

The camera 26 is capable of capturing an image.

Figure 4:
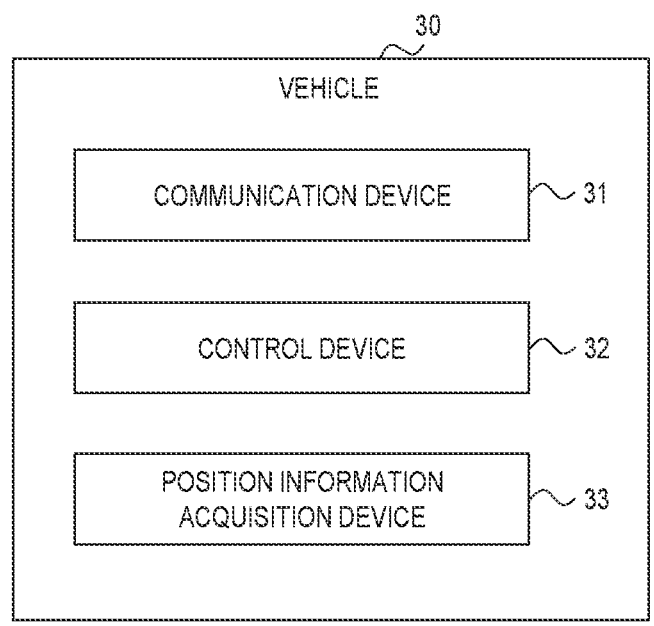
FIG. 4 is a block diagram illustrating a configuration of a vehicle according to an embodiment of the present disclosure.

A configuration of the vehicle 30 according to an embodiment of the present disclosure will be described with reference to FIG. 4.

The vehicle 30 includes a communication device 31, a control device 32, and a position information acquisition device 33. The communication device 31, the control device 32, and the position information acquisition device 33 are communicably connected to each other via an in-vehicle network, such as a controller area network (CAN) or a dedicated line.

The communication device 31 includes a communication module connected to the network 50. For example, the communication device 31 may include a communication module corresponding to a mobile communication standard, such as LTE, 4G, and 5G. In an embodiment, the vehicle 30 is connected to the network 50 via the communication device 31. The communication device 31 transmits and receives various pieces of information via the network 50. The communication device 31 can communicate with the information processing apparatus 10, the terminal 20, and the vehicle 30 via the network 50.

The control device 32 includes at least one processor, at least one dedicated circuit, or a combination thereof. The processor may be a general-purpose processor, such as a CPU or GPU, or a dedicated processor specialized for a specific process. The dedicated circuit may be, for example, an FPGA or an ASIC. The control device 32 executes processing associated with the operation of the vehicle 30 while controlling each part of the vehicle 30.

The position information acquisition device 33 includes one or more receivers corresponding to any satellite positioning system. For example, the position information acquisition device 33 may include a Global Positioning System (GPS) receiver. The position information acquisition device 33 acquires a measured value of a position of the vehicle 30 as position information. The position information includes, for example, an address, latitude, longitude, and altitude.

Figure 5:
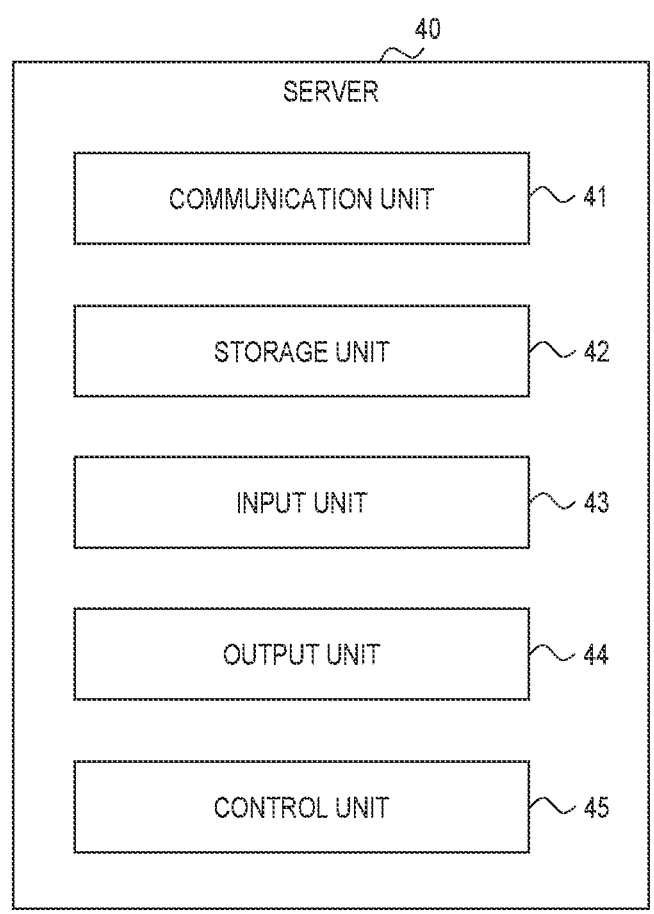
FIG. 5 is a block diagram illustrating a configuration of a server according to an embodiment of the present disclosure.

A configuration of the server 40 according to an embodiment of the present disclosure will be described with reference to FIG. 5.

The server 40 includes a communication unit 41, a storage unit 42, an input unit 43, an output unit 44, and a control unit 45.

The communication unit 41 includes a communication module connected to the network 50. For example, the communication unit 41 may include a communication module corresponding to a LAN. In an embodiment, the server 40 is connected to the network 50 via the communication unit 41. The communication unit 41 transmits and receives various pieces of information via the network 50. The communication unit 41 can communicate with the information processing apparatus 10, the terminal 20, and the vehicle 30 via the network 50.

For example, the storage unit 42 may be, but is not limited to, a semiconductor memory, a magnetic memory, or an optical memory. The storage unit 42 may function as, for example, a primary storage device, a secondary storage device, or a cache memory. The storage unit 42 stores any information used for an operation of the server 40. For example, the storage unit 42 may store a system program, an application program, and various pieces of information received by the communication unit 41. The information stored in the storage unit 42 may be updatable with information received from the network 50 via, for example, the communication unit 41. A part of the storage unit 42 may be installed outside the server 40. In that case, the part of the storage unit 42 installed outside the server 40 may be connected to the server 40 via any interface.

The input unit 43 includes one or more input interfaces that detect a user input and acquire input information based on the user's operation. For example, the input unit 43 includes, but is not limited to, a physical key, a capacitance key, a touch screen provided integrally with a display of the output unit 44, or a microphone that receives a voice input.

The output unit 44 includes one or more output interfaces that notify information to the user by outputting it. For example, the output unit 44 includes, but is not limited to, a display that outputs information as an image or a speaker that outputs information as voice.

The control unit 45 includes at least one processor, at least one dedicated circuit, or a combination thereof. The processor may be a general-purpose processor, such as a CPU or GPU, or a dedicated processor specialized for a specific process. The dedicated circuit may be, for example, an FPGA or an ASIC. The control unit 45 executes processing associated with the operation of the server 40 while controlling each unit of the server 40.

Operation of Information Processing System

The operation of the information processing system 1 illustrated in FIG. 1 will be described.

First, an overview of the car-sharing service provided by the information processing system 1 will be described.

The vehicle 30 is used for the car-sharing service. The vehicle 30 stands by in the parking area 2 when not used by the user. In FIG. 1, one parking area 2 is illustrated, but there may be a plurality of parking areas 2. When there is a plurality of parking areas 2, vehicles 30 unused by the user may stand by in respective parking areas 2.

Figure 6:
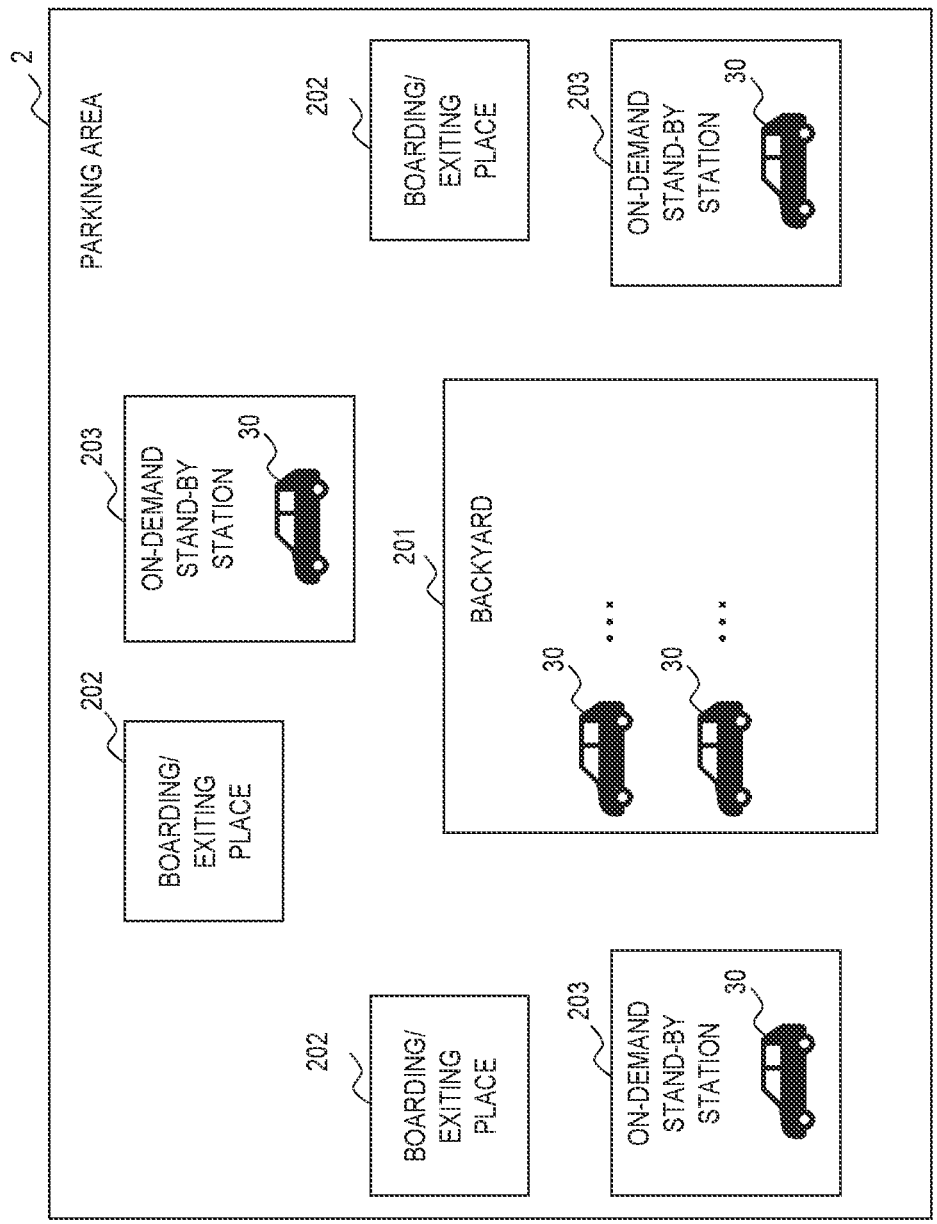
FIG. 6 is a diagram illustrating an example of a parking area.

FIG. 6 illustrates an example of the parking area 2. The parking area 2 is a place at which the vehicle 30 unused by the user can stand by. The parking area 2 may be, for example, a place provided in the basement of an apartment in which the user and the like of the car-sharing service resides.

The parking area 2 includes a backyard 201, a boarding/exiting place 202, and an on-demand stand-by station 203.

An arrangement of the backyard 201, the boarding/exiting place 202, and the on-demand stand-by station 203 illustrated in FIG. 6 is an example. The backyard 201, the boarding/exiting place 202, and the on-demand stand-by station 203 may be arranged in the parking area 2 in a manner other than that illustrated in FIG. 6.

Further, in the example illustrated in FIG. 6, the backyard 201 is provided at one place in the parking area 2, but the backyard 201 may be provided at two or more places in the parking area 2. Further, in the example illustrated in FIG. 6, the boarding/exiting places 202 are provided at three places in the parking area 2, but the number of boarding/exiting places 202 may be two or less, or four or more. Further, in the example illustrated in FIG. 6, the on-demand stand-by stations 203 are provided at three places in the parking area 2, but the number of on-demand stand-by stations 203 may be two or less, or four or more.

The backyard 201 is a place at which the vehicles 30 unused by the user stand by. A charger capable of charging a battery of the vehicle 30 is installed in the backyard 201. A battery of the vehicle 30 that has been used by the user can be charged in the backyard 201.

Further, the vehicle 30 can be cleaned in the backyard 201. A machine capable of automatically cleaning the vehicle 30 may be installed in the backyard 201. The backyard 201 may be provided with a place at which a worker can clean the vehicle 30.

The boarding/exiting place 202 can be used when the user boards or exits the vehicle 30. Upon starting to use the car-sharing service, the user can board the vehicle 30 at the boarding/exiting place 202. Upon finishing using the car-sharing service, the user can exit the vehicle 30 at the boarding/exiting place 202.

The on-demand stand-by station 203 is a place at which the vehicle 30 usable for on-demand use stands by. The on-demand use will be described below. When using the car-sharing service for the on-demand use, the user boards the vehicle 30 stopped at the on-demand stand-by station 203.

The information processing apparatus 10 manages the vehicle 30 used for the car-sharing service. The information processing apparatus 10 manages a plurality of types of vehicles 30. For example, when there are ten vehicles 30 for a type-A, a type-B, and a type-C, respectively, the information processing apparatus 10 manages ten type-A vehicles 30, ten type-B vehicles 30, and ten type-C vehicles 30. As such, by managing the plurality of types of vehicles, the information processing apparatus 10 can present the user with a vehicle 30 according to the user's purpose.

The information processing apparatus 10 acquires application information for using the vehicle 30 from the user. When using the car-sharing service, the user transmits, using the terminal 20, the application information for using the vehicle 30 to the information processing apparatus 10.

In the car-sharing service provided by the information processing system 1, the vehicle 30 can be used in any use form of the reservation use and the on-demand use. The information processing apparatus 10 acquires, from the user, as the application information for using the vehicle 30, one of the application information for the reservation use and the application information for the on-demand use.

The reservation use is a use form in which the user reserves the vehicle 30 in advance and uses it. In the case of the reservation use, the user transmits the application information for the reservation use to the information processing apparatus 10 by operating the terminal 20.

The application information for the reservation use transmitted by the user to the information processing apparatus 10 includes information on a desired type of vehicle, a date and time of starting the use, a scheduled date and time of return, and a desired boarding place. In other words, in the case of the reservation use, the user can designate a type of vehicle 30 to be used. Further, in the case of the reservation use, the user can designate a use period of the vehicle 30 to be used according to the date and time of starting the use and the scheduled date and time of return. Further, in the case of the reservation use, the user can designate the boarding place of the vehicle 30 to be used.

As the boarding place, the user can designate any place, such as the boarding/exiting place 202 in the parking area 2 or the front of the user's residence. In the case of the reservation use, the information processing apparatus 10 dispatches the vehicle 30 allocated to the reservation use such that the vehicle 30 of the type desired by the user arrives at the boarding place designated by the user by a predetermined amount of time before the date and time of starting the use. The vehicle 30 is capable of autonomous driving, and autonomously heads for the boarding place designated by the user in response to a command received from the information processing apparatus 10.

As such, in the case of the reservation use, the user can reliably board the vehicle 30 of the type desired by himself/ herself during a scheduled use period. Further, in the case of the reservation use, the user can board the vehicle 30 at the boarding place desired by himself/herself. Therefore, for example, when making a planned use, such as a family trip or a business trip to a distant place, the form of the reservation use is highly convenient for the user.

The on-demand use is a use form in which the user applies for using the vehicle 30 stopped at the on-demand stand-by station 203 and immediately uses the vehicle 30 on the spot.

In the case of the on-demand use, the user goes to the on-demand stand-by station 203. When there is a vehicle 30 stopped at the on-demand stand-by station 203, the user applies for using the vehicle 30 stopped at the on-demand stand-by station 203. In the case of the on-demand use, the user transmits the application information for the on-demand use to the information processing apparatus 10 by operating the terminal 20.

A two-dimensional code including information necessary for applying for the on-demand use is attached to the vehicle 30. In the case of the on-demand use, the user uses the camera 26 of the terminal 20 to capture an image of the two-dimensional code attached to the vehicle 30 stopped at the on-demand stand-by station 203. The control unit 25 of the terminal 20 transmits the information included in the two-dimensional code to the information processing apparatus 10 via the communication unit 21. The two-dimensional code may include, for example, identification information for identifying the vehicle 30.

The application information for the on-demand use transmitted by the user to the information processing apparatus 10 includes information on the scheduled date and time of return. Unlike the application information for the reservation use, the application information for the on-demand use includes none of the information on the desired type of vehicle, the date and time of starting the use, or the desired boarding place. This is because, in the case of the on-demand use, the user uses the vehicle 30 stopped at the on-demand stand-by station 203, and thus he/she cannot select a type of vehicle or a boarding place. Further, this is because, in the case of the on-demand use, the use is started immediately, and thus the information on the date and time of starting the use is unnecessary.

The control unit 15 of the information processing apparatus 10 controls the dispatch of the vehicle 30 such that only the vehicle 30 that can be used for a minimum provision guarantee time period or longer is stopped at the on-demand stand-by station 203. Here, the minimum provision guarantee time period is a minimum guaranteed time period during which the user can use the vehicle 30 on demand. The minimum provision guarantee time period may be, for example, one and a half hours. In such a manner, by setting the minimum provision guarantee time period, the user can be guaranteed to use the vehicle 30 stopped at the on-demand stand-by station 203 for the on-demand use for at least one and a half hours.

As such, in the case of the on-demand use, when there is a vehicle 30 stopped at the on-demand stand-by station 203, the user can immediately use the vehicle 30. Therefore, when the user desires to immediately use the vehicle 30 for, for example, shopping and transportation in bad weather even though he/she is not scheduled to use it, the form of the on-demand use is highly convenient.

A specific vehicle 30 is not fixed to a specific use form, such as a vehicle dedicated to the reservation use or dedicated to the on-demand use. In other words, whether a certain vehicle 30 is used as a vehicle for the reservation use or the on-demand use is flexible. In other words, the same vehicle 30 can be used for both the reservation use and the on-demand use.

As such, since the use form of the vehicle 30 is not fixed, it is possible to increase an operating rate of the vehicle 30 that can be used for the car-sharing service.

Figure 7:
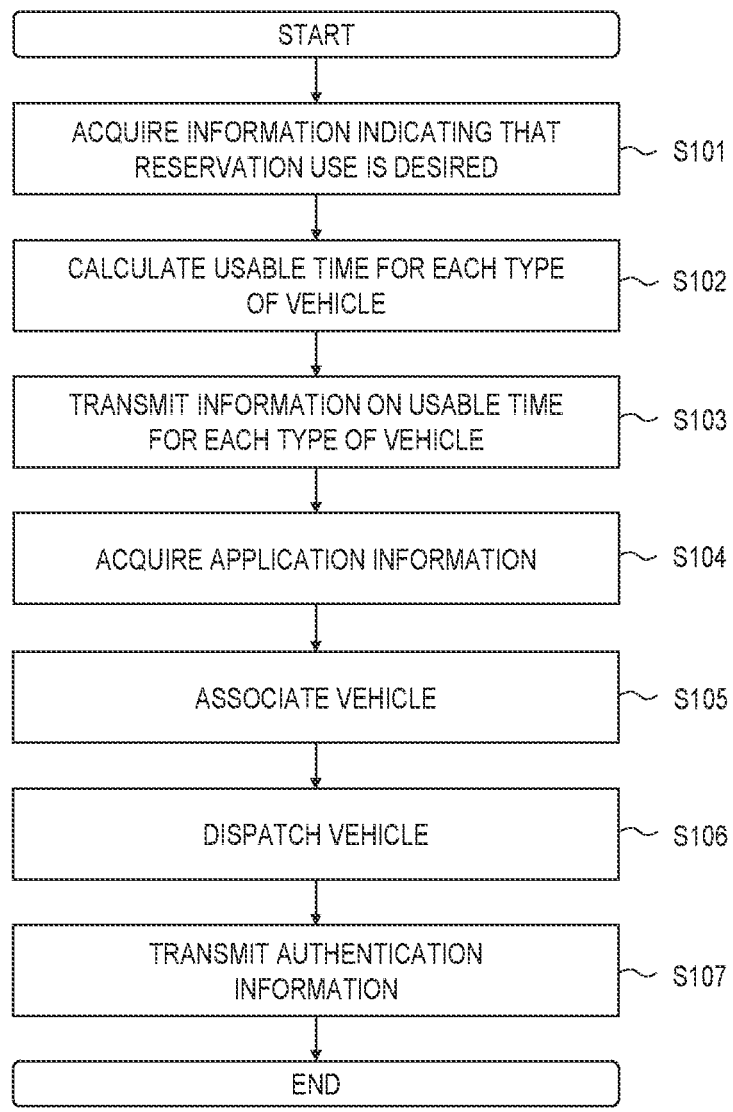
FIG. 7 is a flowchart illustrating an example of an operation of the information processing system according to an embodiment of the present disclosure for reservation use.

The overview of the operation of the information processing system 1 in the case of the reservation use will be described with reference to the flowchart illustrated in FIG. 7.

The input unit 23 of the terminal 20 receives an input indicating that the reservation use is desired from a user who desires the reservation use. The control unit 25 transmits information indicating that the reservation use is desired to the information processing apparatus 10 via the communication unit 21.

The control unit 15 of the information processing apparatus 10 acquires the information indicating that the reservation use is desired, which is transmitted by the terminal 20, via the communication unit 11 (step S101).

The control unit 15 calculates a usable time for each type of vehicle 30 (step S102). For example, when the number of types of vehicles 30 that can be used for the car-sharing service is two, that is, the type-A and the type-B, the control unit 15 calculates the usable times of the type-A vehicle and the type-B vehicle, respectively. The usable time calculated by the control unit 15 is the maximum time period during which the vehicle 30 can be used for the reservation use.

The control unit 15 transmits the information on the usable time for each type of vehicle to the terminal 20 via the communication unit 11 (step S103).

Figure 9:
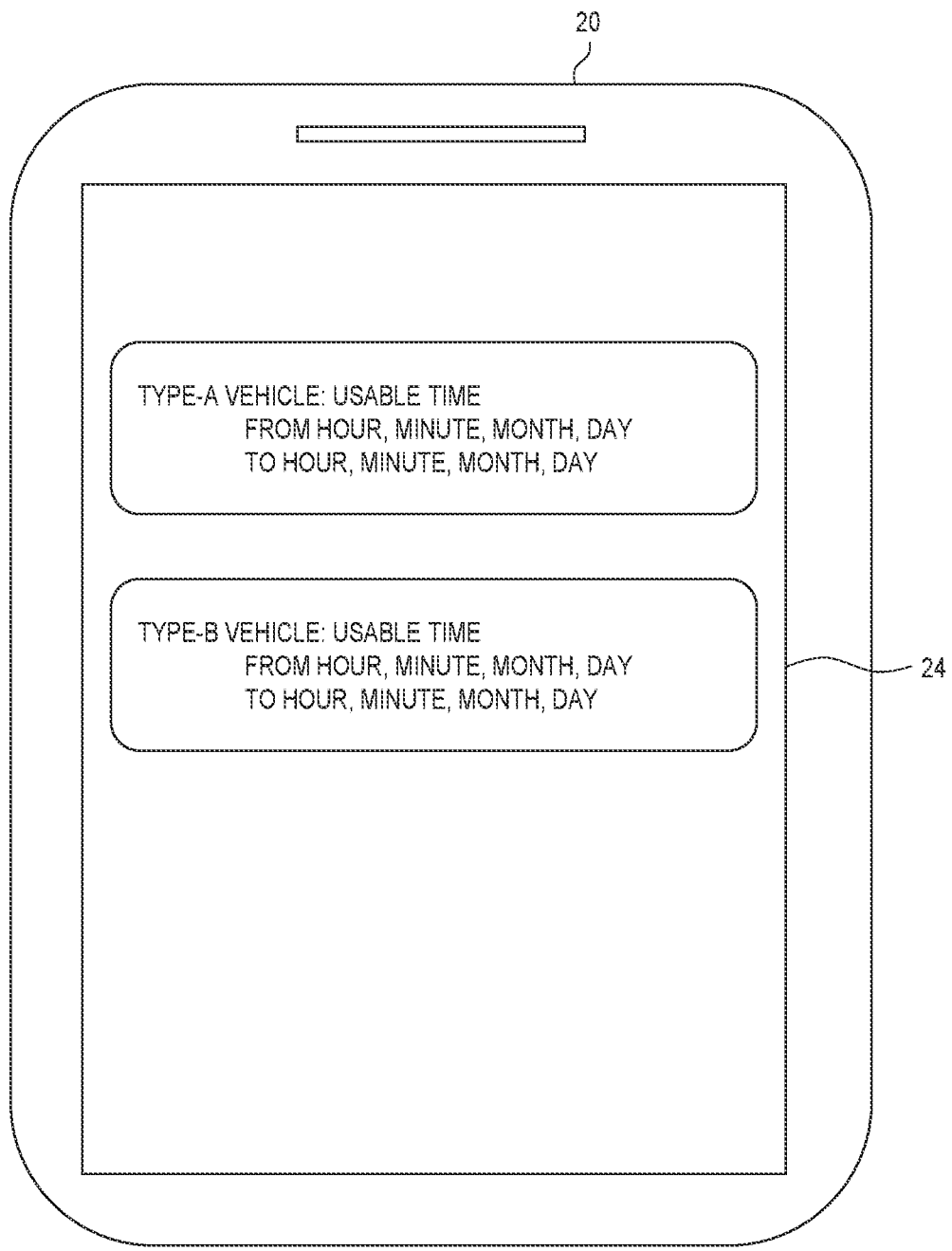
FIG. 9 is a diagram illustrating an example of a display of a usable time for the reservation use.

When the control unit 25 of the terminal 20 acquires the information on the usable time for each type of vehicle, the control unit 25 causes the output unit 24 to display the information on the usable time for each type of vehicle. FIG. 9 illustrates an example of a screen on which the output unit 24 displays the information on the usable time for each type of vehicle.

Figure 10:
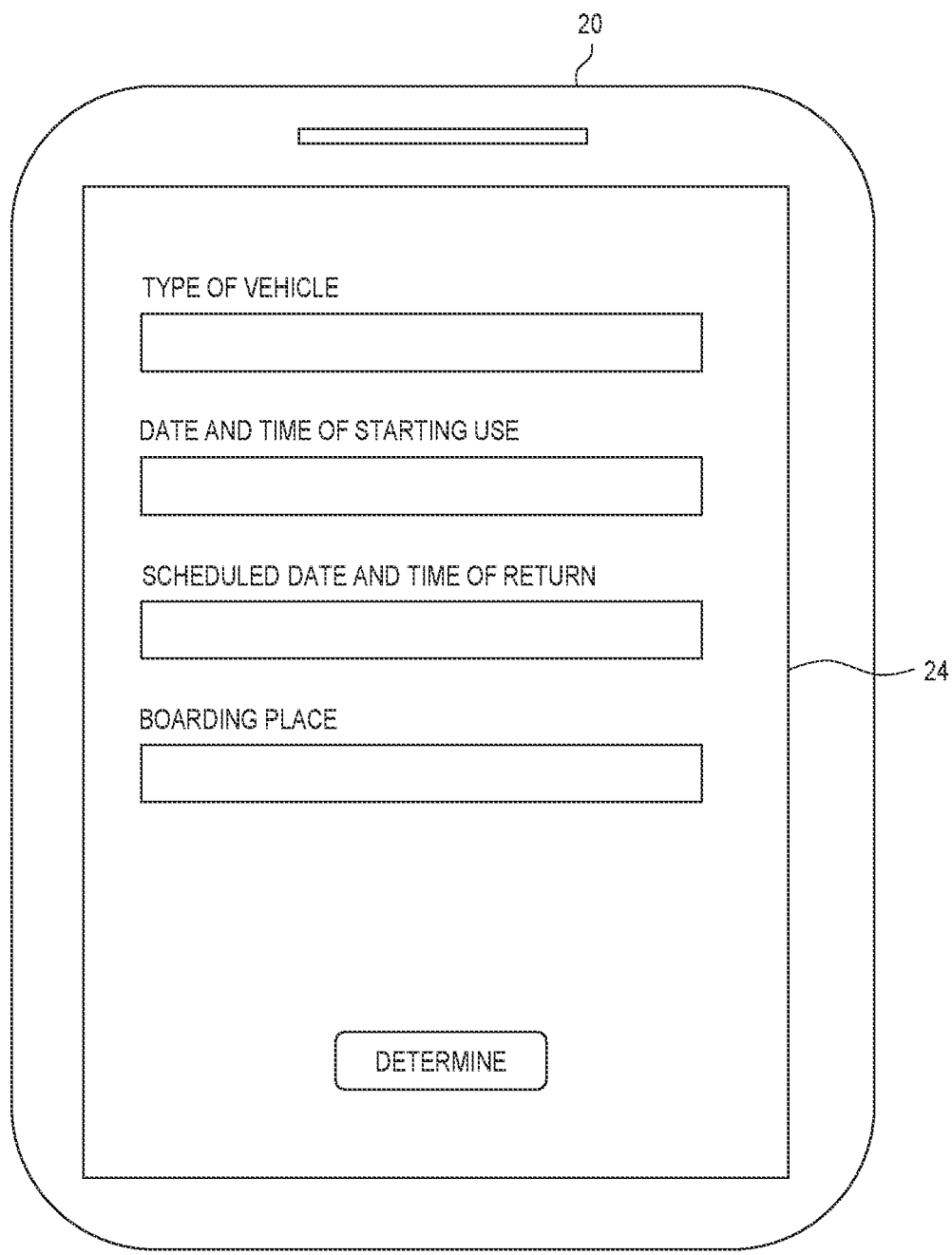
FIG. 10 is a diagram illustrating an example of a display when a user is executing an input operation for the reservation use.

The user who confirms the information on the usable time for each type of vehicle inputs the application information for the reservation use of the vehicle 30 into the input unit 23 of the terminal 20. FIG. 10 illustrates an example of a screen displayed by the output unit 24 when the user inputs the application information. As illustrated in FIG. 10, the user inputs the information on the type of vehicle, the date and time of starting the use, the scheduled date and time of return, and the boarding place. The control unit 25 transmits the application information input by the user to the information processing apparatus 10 via the communication unit 21.

The control unit 15 of the information processing apparatus 10 acquires the application information transmitted by the terminal 20 via the communication unit 11 (step S104).

The control unit 15 associates the vehicle 30 with the acquired application information (step S105). Here, associating the vehicle 30 means specifying the vehicle 30 to be used for the reservation use based on the acquired application information. Associating the vehicle 30 will be described below in detail.

The control unit 15 dispatches the vehicle 30 such that the vehicle 30 arrives at the desired boarding place by the predetermined amount of time before the date and time of starting the use (step S106). The predetermined amount of time may be, for example, 10 minutes. For example, when the date and time of starting the use is 10:00 on January 1st and the predetermined amount of time is 10 minutes, the control unit 15 dispatches the vehicle 30 such that the vehicle 30 arrives at the desired boarding place by 9:50 on January 1st. Upon receiving a vehicle dispatch command from the control unit 15, the vehicle 30 autonomously drives to the boarding place desired by the user.

The control unit 15 transmits authentication information for the user to board the dispatched vehicle 30 to the terminal 20 via the communication unit 11 (step S107).

Upon arriving at the desired boarding place at the date and time of starting the use, the user can start using the vehicle 30 by executing an authentication process to the vehicle 30 stopped at the boarding place using the authentication information acquired by the terminal 20.

The user who finishes using the vehicle 30 may exit the vehicle 30 at any place. The user may exit at, for example, the boarding/exiting place 202 of the parking area 2 or at another place. When the user exits the vehicle 30, it returns to the backyard 201 of the parking area 2 by autonomously driving.

Figure 8:
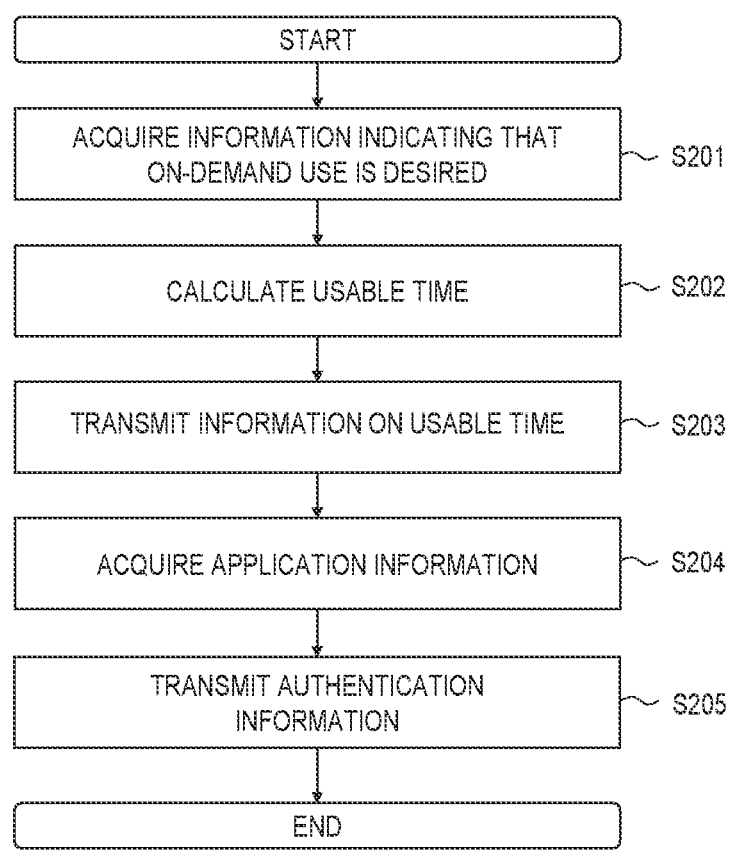
FIG. 8 is a flowchart illustrating an example of the operation of the information processing system according to an embodiment of the present disclosure for on-demand use.

Subsequently, the overview of the operation of the information processing system 1 in the case of the on-demand use will be described with reference to the flowchart illustrated in FIG. 8.

A user who desires the on-demand use goes to the on-demand stand-by station 203 in the parking area 2. When there is a plurality of on-demand stand-by stations 203, the user may go to any on-demand stand-by station 203. For example, the user may go to the on-demand stand-by station 203 closest to a residence in which he/she resides.

A two-dimensional code including information necessary for applying for the on-demand use is attached to the vehicle 30. The user uses the camera 26 of the terminal 20 to capture an image of the two-dimensional code attached to the vehicle 30 stopped at the on-demand stand-by station 203. The control unit 25 transmits the information included in the two-dimensional code to the information processing apparatus 10 via the communication unit 21. The two-dimensional code may include, for example, identification information for specifying the vehicle 30. The fact that the control unit 25 transmits the information included in the two-dimensional code means that the control unit 25 transmits the information indicating that the on-demand use is desired to the information processing apparatus 10 via the communication unit 21.

The control unit 15 of the information processing apparatus 10 acquires the information indicating that the reservation use is desired, which is transmitted by the terminal 20, via the communication unit 11 (step S201).

The control unit 15 calculates the usable time of the vehicle 30 (step S202). Here, the vehicle 30 of which the usable time is calculated by the control unit 15 is the vehicle 30 of which the image of the two-dimensional code is captured by the terminal 20.

The control unit 15 transmits information on the calculated usable time to the terminal 20 via the communication unit 11 (step S203).

Figure 11:
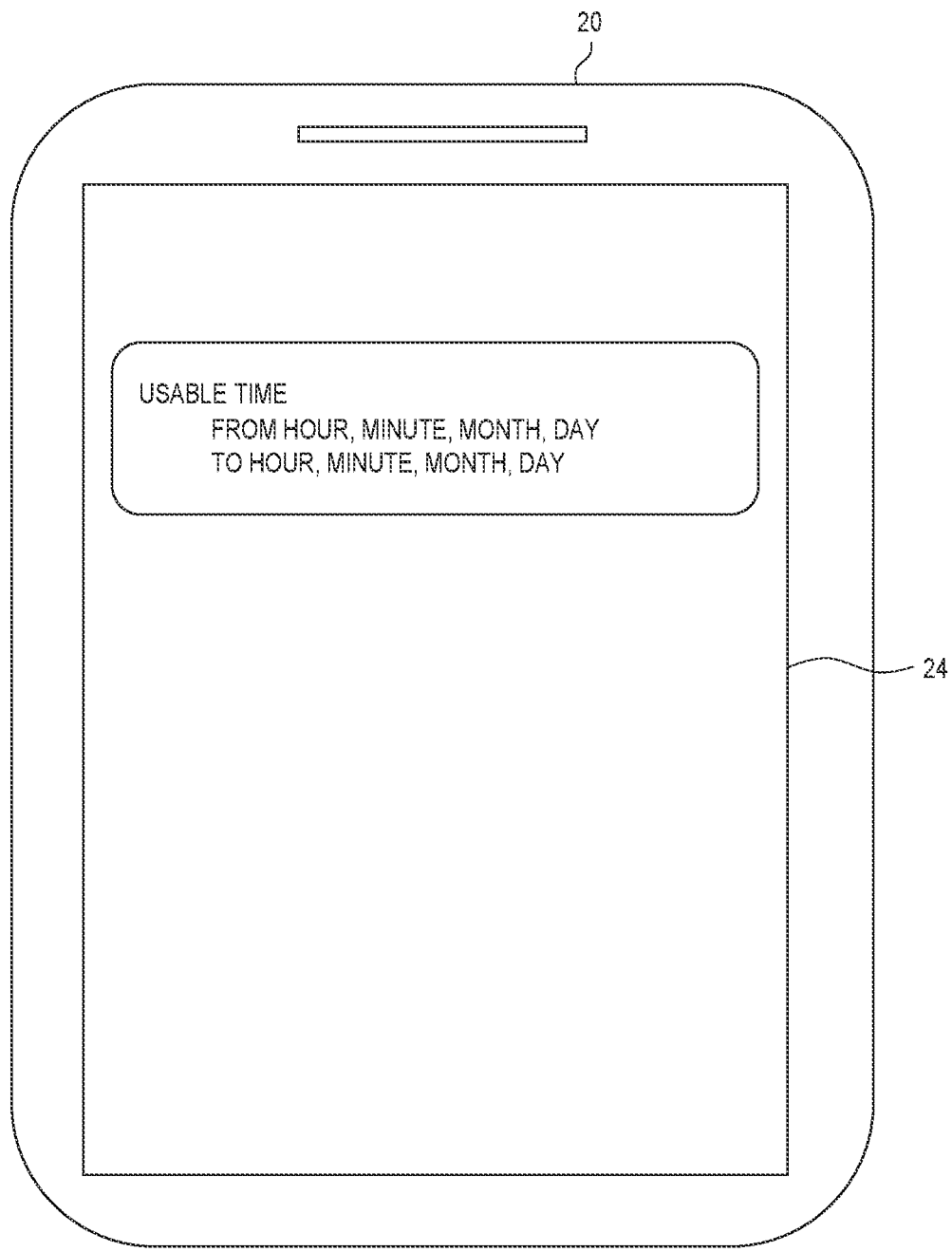
FIG. 11 is a diagram illustrating an example of a display of a usable time for the on-demand use.

When the control unit 25 of the terminal 20 acquires the information on the usable time of the vehicle 30 stopped at the on-demand stand-by station 203, the control unit 25 causes the output unit 24 to display the information on the usable time. FIG. 11 illustrates an example of a screen on which the output unit 24 displays information on the usable time of the vehicle 30 stopped at the on-demand stand-by station 203.

Figure 12:
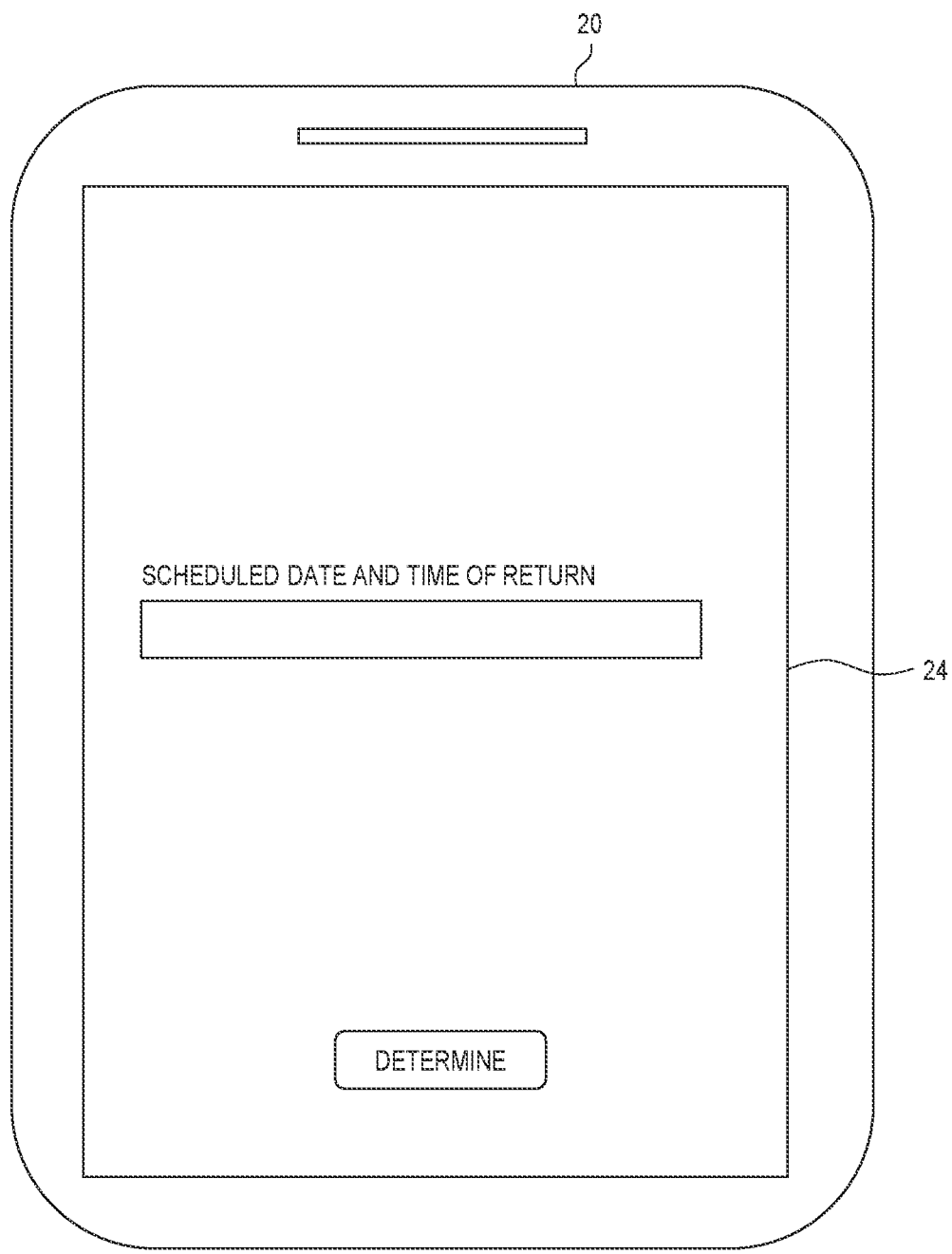
FIG. 12 is a diagram illustrating an example of a display when the user is executing an input operation for the on-demand use.

The user who confirms the information on the usable time of the vehicle 30 stopped at the on-demand stand-by station 203 inputs the application information for the on-demand use of the vehicle 30 into the input unit 23 of the terminal 20. FIG. 12 illustrates an example of a screen displayed by the output unit 24 when the user inputs the application information. As illustrated in FIG. 12, the user inputs information on the scheduled date and time of return. The control unit 25 transmits the application information input by the user to the information processing apparatus 10 via the communication unit 21.

The control unit 15 of the information processing apparatus 10 acquires the application information transmitted by the terminal 20 via the communication unit 11 (step S204).

The control unit 15 transmits the authentication information for the user to board the vehicle 30 stopped at the on-demand stand-by station 203 to the terminal 20 via the communication unit 11 (step S205).

The user can start using the vehicle 30 by executing the authentication process to the vehicle 30 stopped at the on-demand stand-by station 203 using the authentication information acquired by the terminal 20.

The user who finishes using the vehicle 30 may exit the vehicle 30 at any place. The user may exit at, for example, the boarding/exiting place 202 of the parking area 2 or at another place. When the user exits the vehicle 30, it returns to the backyard 201 of the parking area 2 by autonomously driving.

Calculation of Usable Time for Reservation Use

Calculation of the usable time for each type of vehicle for the reservation use illustrated in step S102 of the flowchart of FIG. 7 will be described in detail.

The control unit 15 of the information processing apparatus 10 calculates the usable time by subtracting a lead time and a downtime from a time that is unreserved until the next reserved time of the vehicle 30.

The lead time is a time set as an estimated time for dispatching the reserved vehicle 30 to the boarding place desired by the user. The lead time may be, for example, 30 minutes.

The downtime is a time set as a service provision stop time until the vehicle 30 becomes usable for a next user after the user uses the vehicle 30. The downtime may be a time set in consideration of, for example, a time for charging the battery of the vehicle 30, a time for cleaning the vehicle 30, and a time for maintaining the vehicle 30.

Since the time for charging, the time for cleaning, and the like, differ depending on the type of vehicle, the downtime may also differ for each type of vehicle. For example, when there are two types of vehicles, that is, the type-A vehicle and the type-B vehicle, the downtime of the type-A vehicle may be set to 3 hours, the downtime of the type-B vehicle may be set to 1 hour.

The control unit 15 calculates that the date and time of starting the use at which the reservation use of the vehicle 30 becomes possible is a time elapsed by the lead time from the current time. For example, when the current time is 10:00 on January 1st and the lead time is 30 minutes, the control unit 15 calculates that the date and time of starting the use at which the reservation use of the vehicle 30 becomes possible is 10:30 on January 1st.

As such, in the case of the reservation use, the date and time of starting the use at which the reservation use of the vehicle 30 becomes possible is calculated to be the time elapsed by the lead time from the current time. Therefore, when the user uses the vehicle 30 on reservation, the time that can be set as the date and time of starting the use is the time elapsed by the lead time from the current time.

When calculating the usable time for the reservation use, the control unit 15 may set an upper limit on the usable time. The upper limit may be, for example, one week or two weeks. When the usable time calculated by subtracting the lead time and the downtime from the time that is unreserved until the next reserved time of the vehicle 30 is longer than the upper limit on the usable time, the control unit 15 may calculate that a value of the upper limit on the usable time is the usable time.

The control unit 15 calculates the usable time for each type of vehicle. When there is a plurality of unreserved vehicles 30 of the same type, the control unit 15 selects, as the usable time of the type of vehicle, the longest usable time from among the usable times calculated for the plurality of unreserved vehicles 30.

The control unit 15 transmits the information on the calculated usable time for each type of vehicle to the terminal 20 via the communication unit 11.

Calculation of Usable Time for On-Demand Use

Calculation of the usable time for each type of vehicle for the on-demand use illustrated in step S202 of the flowchart of FIG. 8 will be described in detail.

The control unit 15 of the information processing apparatus 10 calculates the usable time by subtracting a downtime from a time that is unreserved until the next reserved time of the vehicle 30.

The control unit 15 calculates that the date and time of starting the use at which the on-demand use of the vehicle 30 becomes possible is the current time. For example, when the current time is 10:00 on January 1, the control unit 15 calculates that the date and time of starting the use at which the on-demand use of the vehicle 30 becomes possible is 10:00 on January 1.

As such, in the case of the on-demand use, the date and time of starting the use at which the on-demand use of the vehicle 30 becomes possible is calculated to be the current time. Therefore, in the case of the on-demand use, the user can immediately use the vehicle 30.

When calculating the usable time for the on-demand use, the control unit 15 may set an upper limit on the usable time. The upper limit may be, for example, 12 hours. When the usable time calculated by subtracting the downtime from the time that is unreserved until the next reserved time of the vehicle 30 is longer than the upper limit on the usable time, the control unit 15 calculates that a value of the upper limit on the usable time is the usable time.

As such, the control unit 15 calculates the usable time of the vehicle 30 using a different method depending on whether the use form is the reservation use or the on-demand use.

Reservation Table

Figure 13:
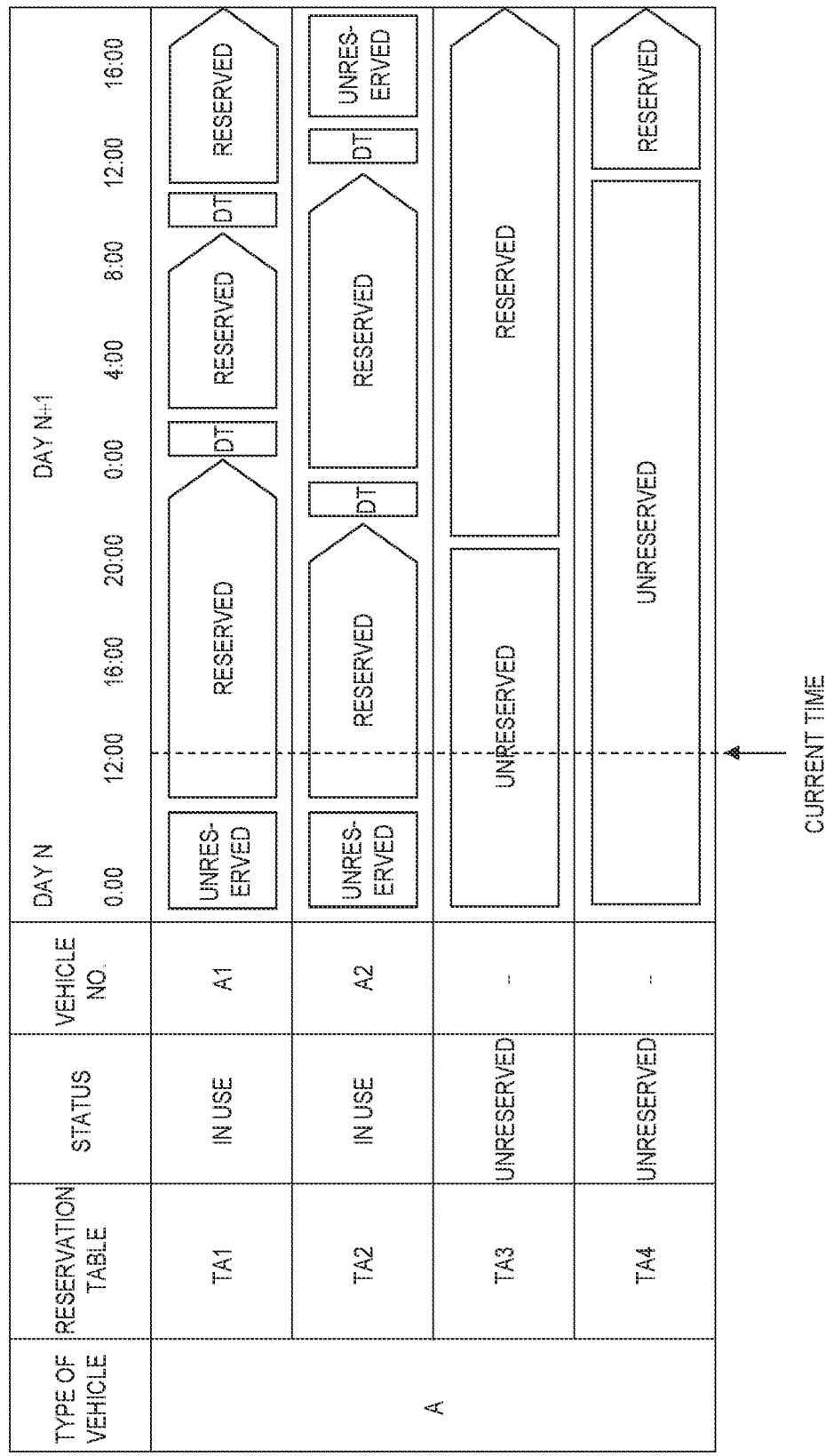
FIG. 13 is a diagram illustrating an example of a reservation table.

The control unit 15 of the information processing apparatus 10 manages a use schedule of the vehicle 30 using a reservation table. FIG. 13 illustrates an example in which the control unit 15 manages the type-A vehicle 30 using the reservation table.

The number of reservation tables is the same as the number of vehicles 30 used for the car-sharing service. Further, the number of reservation tables for each type of vehicle is the same as the number of vehicles 30 for each type of vehicle.

In other words, for example, when the number of type-A vehicles, type-B vehicles, and type-C vehicles is 10 respectively, the number of reservation tables of the type-A vehicles is 10, the number of reservation tables of the type-B vehicles is 10, and the number of reservation tables of the type-C vehicles is 10.

When the number of vehicles 30 that can be used for the car-sharing service is decreased due to regular maintenance or the like, the control unit 15 decreases the number of reservation tables accordingly. For example, when the number of usable type-A vehicles is decreased from 10 to 9 due to the regular maintenance, the control unit 15 decreases the number of reservation tables of the type-A vehicles from 10 to 9.

Each reservation table is not fixedly associated with a specific vehicle 30. In other words, which vehicle 30 uses the use schedule managed by a certain reservation table is flexible.

In the case of the reservation use, before a predetermined amount of time from starting the reservation use, the control unit 15 determines which vehicle is to be associated with a reservation table. The predetermined amount of time may be, for example, 30 minutes.

In the case of the on-demand use, when accepting the application for the on-demand use, the control unit 15 determines which vehicle is to be associated with a reservation table.

FIG. 13 illustrates a state in which there are four type-A vehicles 30 and the control unit 15 manages the type-A vehicles 30 using four reservation tables TA1 to TA4. The reservation table includes a status, a vehicle number, and schedule information.

The status indicates whether the reservation table is "in use" or "unreserved" at the current time. In the example illustrated in FIG. 13, since the schedules of the reservation tables TA1 and TA2 are "reserved" at the current time, the statuses of the reservation tables are "in use". A time slot displayed as "reserved" in the schedule means that a reservation has been made for that time slot.

Further, in the example illustrated in FIG. 13, since the schedules of the reservation tables TA3 and TA4 are "unreserved" at the current time, the statuses of the reservation tables are "unreserved". A time slot displayed as "unreserved" in the schedule means that no reservation has been made for that time slot.

The vehicle number indicates the vehicle 30 currently associated with the reservation table. In the example illustrated in FIG. 13, the vehicle 30 having the vehicle number "A1" is currently associated with the reservation table TA1. This means that the vehicle 30 specified by the vehicle number "A1" is being used for the reservation from 11:00 on Day N to 0:00 on Day N+1 on the reservation table TA1. Further, the vehicle 30 having the vehicle number "A2" is associated with the reservation table TA2.

In the example illustrated in FIG. 13, vehicle number fields of the reservation tables TA3 and TA4 are blank. This means that the reservation tables TA3 and TA4 are not associated with specific vehicles 30 at the current time.

In the example illustrated in FIG. 13, schedule fields are displayed as "unreserved", "reserved", and "DT". A time slot displayed as "unreserved" means that no reservation has been made for that time slot. A time slot displayed as "reserved" means that a reservation has been made for that time slot. A time slot displayed as "DT" means that the time is the downtime. The time slot displayed as "reserved" may be a sum of the lead time and a time reserved by the user.

In the example illustrated in FIG. 13, when information indicating that the reservation use is desired is acquired from the user, both reservation tables TA3 and TA4 have unreserved time slots but the reservation table TA4 has a longer unreserved time slot. For this reason, the control unit 15 transmits the usable time calculated for the reservation table TA4 to the terminal 20 via the communication unit 11.

In the example illustrated in FIG. 13, since the current time is 12:00 on Day N, the control unit 15 calculates that the date and time of starting the usable time is 12:30 on Day N, which is a time elapsed by the lead time from 12:00 on Day N. The lead time is assumed to be 30 minutes.

Further, in the example illustrated in FIG. 13, in the reservation table TA4, a reservation from 12:00 on Day N+1 is made. In this case, the control unit 15 calculates that a date and time of ending the usable time is 11:00 on Day N+1, which is a time advanced by the downtime from 12:00 on Day N+1. The downtime is assumed to be 1 hour.

As such, the control unit 15 calculates that the usable time of the type-A vehicle for the reservation use is from 12:30 on Day N to 11:00 on Day N+1.

In the example illustrated in FIG. 13, when information indicating that the on-demand use of the type-A vehicle 30 stopped at the on-demand stand-by station 203 in the parking area 2 is desired is acquired from the user, both reservation tables TA3 and TA4 have unreserved time slots but the reservation table TA4 has a longer unreserved time slot. For this reason, the control unit 15 transmits the usable time calculated for the reservation table TA4 to the terminal 20 via the communication unit 11.

In the case of the on-demand use, the date and time of starting the usable time is 12:00 on Day N, which is the current time.

Further, in the same manner as in the reservation use, the control unit 15 calculates that the date and time of ending the usable time is 11:00 on Day N+1, which is a time advanced by the downtime from 12:00 on Day N+1.

As such, the control unit 15 calculates that the usable time for the on-demand use is from 12:00 on Day N to 11:00 on Day N+1.

Figure 14:
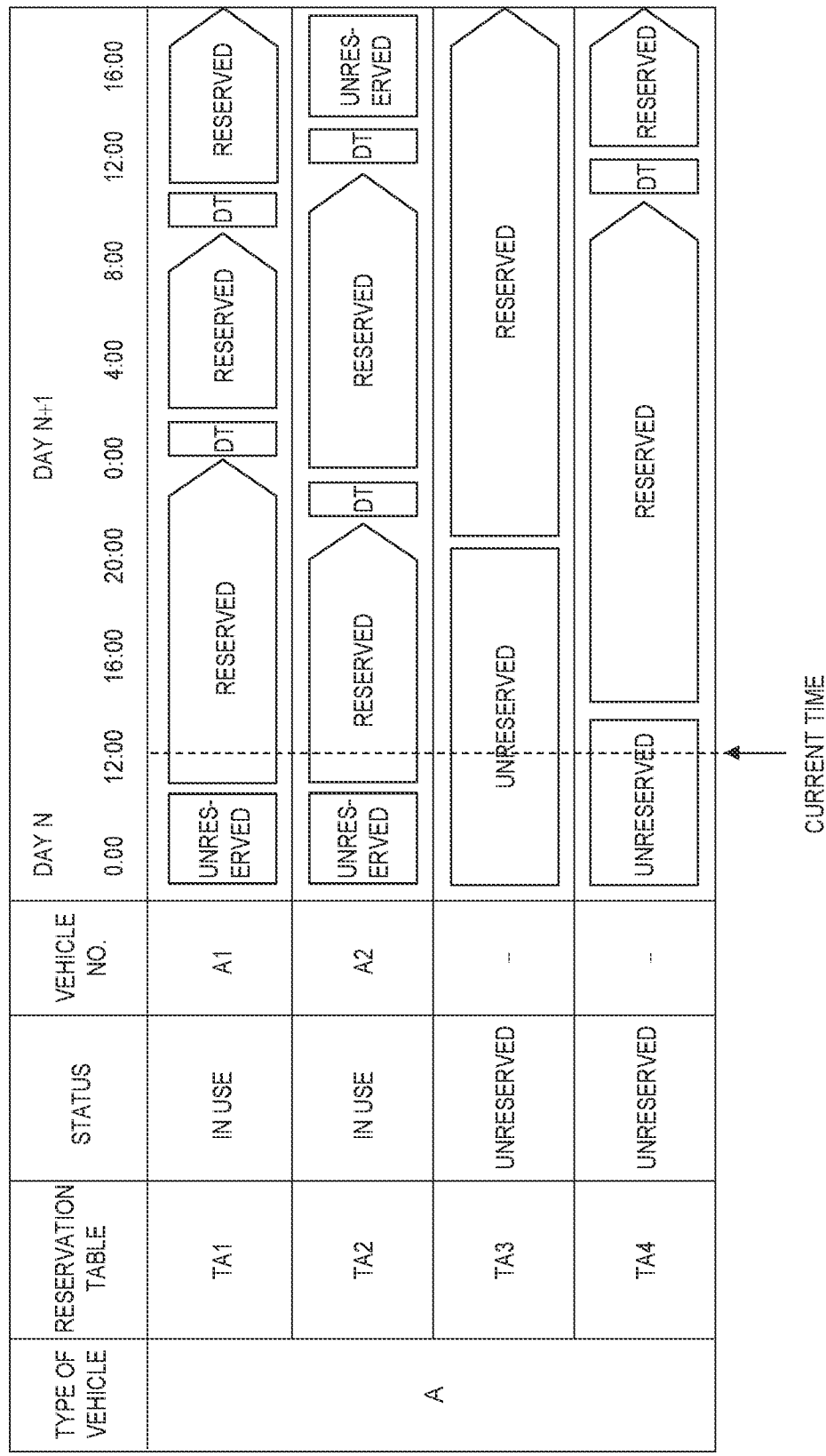
FIG. 14 is a diagram illustrating an example of the reservation table to which a new reservation is added.

FIG. 14 illustrates a state where the control unit 15 adds use schedule information of a new reservation to the reservation table TA4. In the example illustrated in FIG. 14, the control unit 15 adds use schedule information in a time slot from 13:00 on Day N to 11:00 on Day N+1 as the use schedule information of the new reservation. The use schedule information of the new reservation is displayed as "reserved (newly reserved)" in FIG. 14. The use schedule information may be a sum of the lead time and a time reserved by the user. At this time, the control unit 15 adds the downtime after the use schedule information of the new reservation. In the example illustrated in FIG. 14, the control unit 15 adds the downtime from 11:00 to 12:00 on Day N+1.

FIG. 15 illustrates an example of a state where the control unit 15 manages the type-A vehicles 30 and the type-B vehicles 30 using the reservation tables. FIG. 15 illustrates a state where there are two type-A vehicles 30 and two type-B vehicles 30. The control unit 15 manages the type-A vehicles 30 using two reservation tables TA1, TA2. Further, the control unit 15 manages the type-B vehicles 30 using two reservation tables TB1, TB2.

In the example illustrated in FIG. 15, when information indicating that the reservation use is desired is acquired from the user, the reservation tables TA2 and TB2 have unreserved time slots. The control unit 15 calculates the usable time for the type-A vehicle based on the reservation table TA2. The control unit 15 calculates the usable time for the type-B vehicle based on the reservation table TB2.

In the example illustrated in FIG. 15, both the reservation table TA2 of the type-A vehicle and the reservation table TB2 of the type-B vehicle are "unreserved" from 12:00 on Day N, which is the current time, to 0:00 on Day N+1. However, in the example illustrated in FIG. 15, the downtime of the type-A vehicle differs from that of the type-B vehicle. The downtime of the type-A vehicle is 3 hours, and the downtime of the type-B vehicle is 1 hour. For this reason, the control unit 15 calculates different usable times for the type-A vehicle and the type-B vehicle.

Specifically, the control unit 15 calculates that the usable time for the type-A vehicle is from 12:30 to 21:00 on Day N. Further, the control unit 15 calculates that the usable time for the type-B vehicle is from 12:30 to 23:00 on Day N.

FIG. 16 illustrates an example of the reservation tables of the type-A vehicles when applications for the reservation use are acquired from four users.

In the example illustrated in FIG. 16, the control unit 15 adds four pieces of use schedule information to the reservation table TA1. As such, the control unit 15 can maximize the operating rate of the vehicle 30 by collectively adding use schedule information to one reservation table as much as possible.

For example, when four pieces of use schedule information are distributed and added to the four reservation tables TA1 to TA4, a fifth user cannot use the type-A vehicle on a long-term reservation throughout Day N and Day N+1. However, as illustrated in FIG. 16, when the control unit 15 collectively adds the use schedule information to one reservation table, there are unreserved time slots in the reservation tables TA2 to TA4, and thus the fifth user can use the type-A vehicle on a long-term reservation throughout Day N and Day N+1. As such, the control unit 15 can maximize the operating rate of the type-A vehicle 30.

As described above, in the information processing apparatus 10 according to the present embodiment, the control unit 15 acquires, from the user, as the application information for using the vehicle 30, one of the application information for the reservation use and the application information for the on-demand use. Further, the same vehicle 30 can be used for both the reservation use and the on-demand use. As such, the information processing apparatus 10 does not fix a specific vehicle 30 to a specific use form, for example, dedicated to the reservation use or dedicated to the on-demand use. Therefore, when the information processing apparatus 10 according to the present embodiment is used for the car-sharing service, it is possible to smoothly execute both the reservation use and the on-demand use.

The present disclosure is not limited to the embodiments described above. For example, a plurality of blocks described in the block diagram may be integrated, or one block may be divided. Instead of executing the plurality of steps described in the flowchart in a time series as described, they may be executed in parallel or in a different order according to the processing capacity of a device that executes each step, or as necessary. It is possible to make other changes without departing from the gist of the present disclosure.

For example, some processing operations executed in the information processing apparatus 10 in the above-described embodiments may be executed in the terminal 20 or the server 40.

For example, some processing operations executed in the terminal 20 in the above-described embodiments may be executed in the information processing apparatus 10 or the server 40.

For example, some processing operations executed in the server 40 in the above-described embodiments may be executed in the information processing apparatus 10 or the terminal 20.

For example, in the above-described embodiments, the information processing apparatus 10 and the server 40 have been described as independent devices, but the information processing apparatus 10 and the server 40 may be integrated into one.

For example, a general-purpose electronic apparatus, such as a smartphone or a computer, can be configured to function as the information processing apparatus 10 according to the above-described embodiments. Specifically, a program describing processing content for implementing each function of the information processing apparatus 10 or the like according to the embodiments is stored in the memory of the electronic apparatus, and is read and executed by the processor of the electronic apparatus. Therefore, it is also possible to implement the disclosure according to an embodiment as a program that can be executed by the processor.

In the above-described embodiments, a case where there is a plurality of types of vehicles 30 that can be used for the car-sharing service has been described, but the number of the type of vehicles 30 may be one.

What is claimed is:

1. An information processing apparatus that manages a plurality of vehicles used for a car-sharing service, the information processing apparatus comprising a processor configured to:
acquire, from a user terminal, information indicating that a use of a vehicle of the plurality of vehicles is desired;
make a determination whether the information indicating that the use of the vehicle is desired is (i) information indicating that reservation use for making a reservation in advance is desired or (ii) information indicating that on-demand use for accepting use of the vehicle stopped at an on-demand stand-by station is desired;
automatically calculate usable time of the vehicle that is desired to use, based on a result of the determination, by (1) considering a lead time for the vehicle autonomously driving to a desired boarding place if the reservation in advance is desired, (2) not considering the lead time if the on-demand use is desired, and (3) considering a downtime for the vehicle for both the reservation in advance and the on-demand use, wherein different vehicles of the plurality of vehicles have different downtimes;
transmit the calculated usable time to the user terminal;
transmit a type of the vehicle along with the usable time in response to a determination that the information indicating that the use of the vehicle is desired is (i) the information indicating the reservation use; and
acquire, from the user terminal, as application information for using the vehicle, one of application information for the reservation use or application information for the on-demand use; and
generate a vehicle dispatch command when the processor receives the application information for the reservation use, and transmit the vehicle dispatch command to the vehicle so to cause the vehicle to start autonomously driving to the desired boarding place, the desired boarding place being included with the application information,
wherein the same vehicle is allowed to be used for both the reservation use and the on-demand use.

2. The information processing apparatus according to claim 1, wherein the application information for the reservation use includes information on a desired kind of vehicle, a date and time of starting the use, and a scheduled date and time of return.

3. The information processing apparatus according to claim 1, wherein the application information for the on-demand use includes information on a scheduled date and time of return.

4. The information processing apparatus according to claim 1, wherein the processor is configured to, in a case of the on-demand use, acquire the application information for the on-demand use from the user terminal based on a two-dimensional code attached to the vehicle.

5. The information processing apparatus according to claim 1, wherein the on-demand use has a minimum provision guarantee time period.

6. The information processing apparatus according to claim 1, wherein the reservation use has an upper limit on a usable time.

7. The information processing apparatus according to claim 1, wherein the on-demand use has an upper limit on a usable time.

8. The information processing apparatus according to claim 1, wherein the processor is configured to transmit the calculated usable time including instructions for causing the user terminal to automatically display the calculated usable time.

9. The information processing apparatus according to claim 1, wherein, when the processor makes a determination that the information indicating that the use of the vehicle is desired is (i) the information indicating that reservation use for making a reservation in advance is desired, the processor is configured to:
calculate usable times of a plurality of vehicles; and
select as the usable time of the vehicle, the longest usable time from among the usable times calculated for the plurality of the vehicles.

10. A non-transitory computer readable storage medium that stores a program causing a computer that manages a plurality of vehicles used for a car-sharing service to execute operations, the operations comprising:
acquiring, from a user terminal, information indicating that a use of a vehicle of the plurality of vehicles is desired;
making a determination whether the information indicating that the use of the vehicle is desired is (i) information indicating that reservation use for making a reservation in advance is desired or (ii) information indicating that on-demand use for accepting use of the vehicle stopped at an on-demand stand-by station is desired;
automatically calculating usable time of the vehicle that is desired to use, based on a result of the determination, by (1) considering a lead time for the vehicle autonomously driving to a desired boarding place if the reservation in advance is desired, and (2) not considering the lead time if the on-demand use is desired, and (3) considering a downtime for the vehicle for both the reservation in advance and the on-demand use, wherein different vehicles of the plurality of vehicles have different downtimes;

transmitting the calculated usable time to the user terminal, transmitting a type of the vehicle along with the usable time in response to a determination that the information indicating that the use of the vehicle is desired is (i) the information indicating the reservation use; and acquiring, from the user terminal, as application information for using the vehicle, one of application information for the reservation use or application information for the on-demand use;

generating a vehicle dispatch command when the computer receives the application information for the reservation use, and transmitting the vehicle dispatch command to the vehicle so to cause the vehicle to start autonomously driving to the desired boarding place, the desired boarding place being included with the application information, wherein the same vehicle is allowed to be used for both the reservation use and the on-demand use.

11. The non-transitory storage medium according to claim 10, wherein the application information for the reservation use includes information on a desired kind of vehicle, a date and time of starting the use, and a scheduled date and time of return.

12. The non-transitory storage medium according to claim 10, wherein the application information for the on-demand use includes information on a scheduled date and time of return.

13. The non-transitory storage medium according to claim 10, wherein the operations further include acquiring the application information for the on-demand use from the user terminal based on a two-dimensional code attached to the vehicle.

14. The non-transitory storage medium according to claim 10, wherein the on-demand use has a minimum provision guarantee time period.

15. The non-transitory storage medium according to claim 10, wherein the reservation use has an upper limit on a usable time.

16. The non-transitory storage medium according to claim 10, wherein the on-demand use has an upper limit on a usable time.

17. An information processing method executed by an information processing apparatus that manages a plurality of vehicles used for a car-sharing service, the information processing method comprising:

acquiring, from a user terminal, information indicating that a use of a vehicle of the plurality of vehicles is desired;

making a determination whether the information indicating that the use of the vehicle is desired is (i) information indicating that reservation use for making a reservation in advance is desired or (ii) information indicating that on-demand use for accepting use of the vehicle stopped at an on-demand stand-by station is desired;

automatically calculating usable time of the vehicle that is desired to use, based on a result of the determination, by (1) considering a lead time for the vehicle autonomously driving to a desired boarding place if the reservation in advance is desired, (2) not considering the lead time if the on-demand use is desired, and (3) considering a downtime for the vehicle for both the reservation in advance and the on-demand use, wherein different vehicles of the plurality of vehicles have different downtimes;

transmitting the calculated usable time to the user terminal;

transmitting a type of the vehicle along with the usable time in response to a determination that the information indicating that the use of the vehicle is desired is (i) the information indicating the reservation use;

acquiring, from the user terminal, as application information for using the vehicle, one of application information for the reservation use or application information for the on-demand use;

generating a vehicle dispatch command when the information processing apparatus receives information for the reservation use, and transmitting the vehicle dispatch command to the vehicle so to cause the vehicle to start autonomously driving to the desired boarding place, wherein the same vehicle is allowed to be used for both the reservation use and the on-demand use.

* * * * *